June 9, 1964  J. R. BARLETTA  3,136,871
PRESSURE RESPONSIVE LIQUID LEVEL CONTROL
Filed Sept. 26, 1961
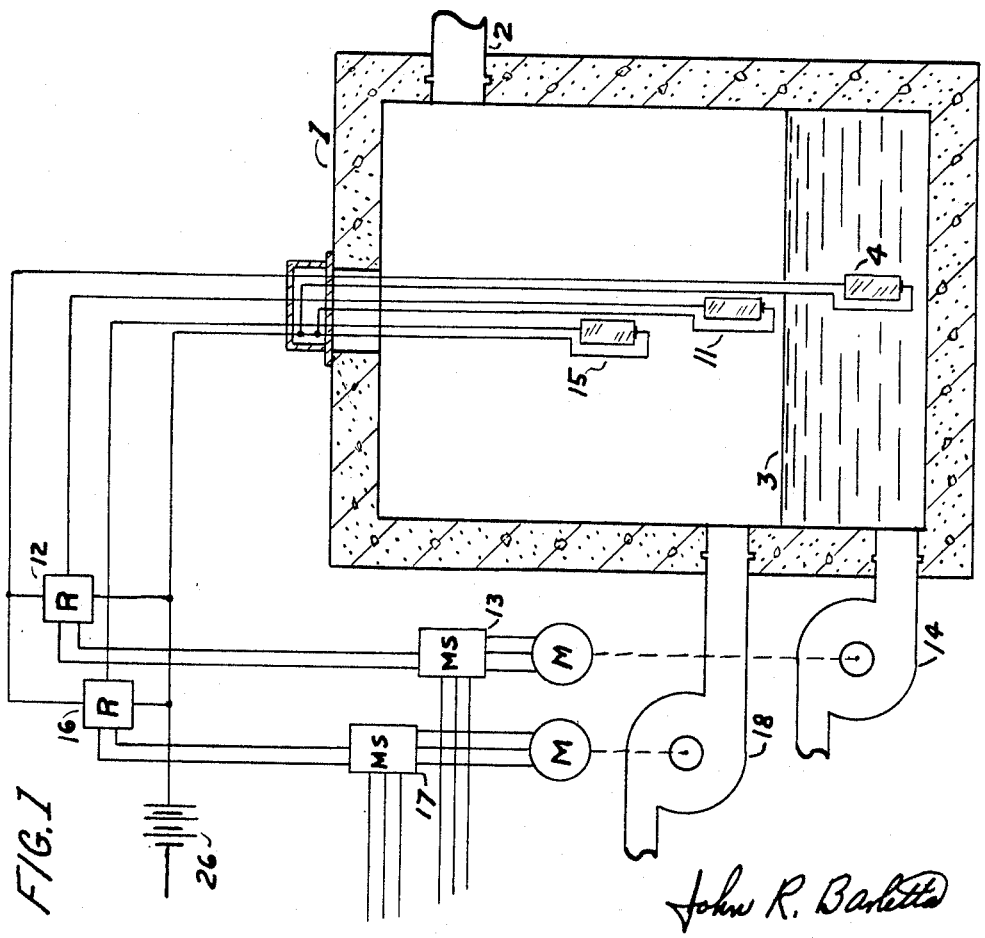
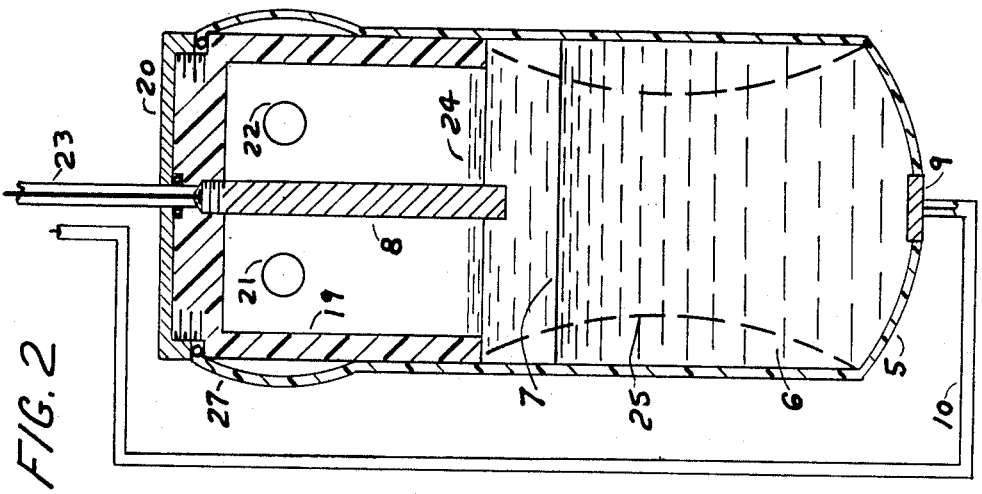
John R. Barletta

United States Patent Office 3,136,871
Patented June 9, 1964

3,136,871
PRESSURE RESPONSIVE LIQUID
LEVEL CONTROL
John R. Barietta, Detroit, Mich.
(31224 Bretz Drive, Warren, Mich.)
Filed Sept. 26, 1961, Ser. No. 140,904
1 Claim. (Cl. 200—81)

This invention relates to an improved apparatus for responding to liquid level changes in a container, for the purpose of regulating or controlling this liquid level by automatically actuating various means for the withdrawal or admission of proper amounts of liquid to accomplish the desired control.

The invention pertains to the protection of any electrical contact means or electrodes, which are positioned or suspended in a container, housing the liquid to be controlled at predetermined levels so that when the liquid contacts such an electrode, it will open or close an electrical control circuit as a result of that contact. Electrode type controls have had, in the past, several disadvantages, because of the direct exposure of the electrodes to the liquid being controlled.

(1) Where the liquid is highly corrosive it will attack and foul the electrode, causing poor or improper electrical contact, thereby preventing the electrical circuit from opening or closing as intended.

(2) Where the liquid contains insulating materials such as suspended solids or oil and grease, it will coat the exposed electrodes, thereby insulating them and preventing electrical contact.

(3) Where the liquid to be controlled is a non-conductor of electricity, the exposed electrodes will not make electrical contact, thereby causing the control to be inoperative.

(a) Where the liquid is a poor or erratic conductor of electricity, the exposed electrodes will not make proper electrical contact, thereby causing the control to operate in a sluggish or erratic manner.

More recently means have been devised to help extend the service life of electrodes operating in liquids which contain corrosive or insulating materials. One such method is to suspend the electrodes in a vertical chamber or pipe, open at the bottom and in contact with the liquid to be controlled; the upper portion of which is attached to a clean fresh water supply, which is admitted into the pipe on a continuous or intermittent basis, in order to dilute the corrosive or insulating material in the liquid to be controlled, thereby delaying, to some extent, the corrosive or insulating action of the controlled liquid.

Another recent method is similar to the above except a flexible plastic bulb is attached to the bottom of the vertical chamber and filled with clean water; the vertical chamber is vented to the atmosphere, thereby allowing the clean water to make electrical contact with the electrodes by responding to the liquid level changes, by means of water pressure exerted on the plastic bulb.

Both of the above methods require heavy vertical chambers and extensive support, the extent of which depends on the vertical dimension of the sump or tank of liquid to be controlled. The second method also requires venting, which exposes the clean liquid to the atmosphere and consequent loss of the liquid through evaporation. Also, in the second method the large volume of the flexible bulb is prone to rupture when exposed in a tank of liquid subject to agitation and other hydraulic disturbances. In addition the extensive flexing required to respond to a nominal liquid level differential sets up stresses at various points that lead to fatigue failures. The second method is limited to a nominal distance of vertical liquid control because it can only respond to a height where the volume of clean liquid in the vertical chamber is equal to the volume of the flexible bulb.

The primary object of this invention is to provide a new and different liquid level control apparatus which is designed to avoid all the above mentioned disadvantages, and also disadvantages of other liquid control means such as float type controls. Additional objects of this invention are to provide economical, operational and maintenance advantages. In order to accomplish these purposes and advantages each separate electrode is enclosed in a sealed flexible enclosure, which is partially filled with clean water or some other conductive fluid. The enclosure is constructed in such a manner so that the fluid it contains normally does not contact the electrode, unless the liquid to be controlled is at such a level which will exert a hydrostatic pressure, thereby causing the flexible enclosure to respond and cause the sealed-in fluid to rise and make electrical contact through a non-corrosive sealed-in metal plate at the bottom of the enclosure. This sealed-in metal plate can be exposed both to the sealed-in fluid and the liquid to be controlled; or can be attached to a separate insulated electrically conductive wire. The enclosure is provided with flexible folds in its upper portion to allow space for the displaced air or gas when the fluid is in contact position because of the compressed condition of the lower portion of the flexible sealed enclosure. In order to prevent compression or collapse of the upper portion of the enclosure and also to provide dimensional stability for the device, the area is reinforced with a solid inflexible preferably non-conductive material with suitable holes in it so that it will allow the uppor portion of the enclosure to expand but not contract. The device constitutes enough weight and mass to prevent it from floating and yet be small and light enough to be suspended from a single light gauge insulated wire, directly into the tank or sump of the liquid to be controlled, thereby providing minimum support at the top of the container or support such as may normally be provided for exposed electrodes. The sealed-in fluid can be water or some other conductive fluid, however, in the use of water a small amount of chemical will be added to sterilize the fresh water and prevent any bacteriological action or stagnation. Also to better adapt the device to high temperature and therefore expansion of the sealed-in air or gas the enclosure will be under a slight vacuum at normal room temperatures. Such vacuum will only be enough to keep the folds in the upper part of the enclosure collapsed so that there will be ample room for displacement when a hydrostatic pressure is exerted.

The above and other features of the present invention will be better understood by the following detailed description of the accompanying drawing:

FIG. 1 is a vertical section through a tank illustrating a typical application of the invention along with a diagram of the related relays and other electrical contact means required to complete the control apparatus.

FIG. 2 is an enlarged, detailed, fragmentary, vertical section through a typical device such as 4, 11 and 15, of FIG. 1.

Referring to FIG. 1, I have shown at 1 a tank containing the liquid to be controlled; this tank can be of any general construction normally used for the collection or holding of water, sewage, industrial chemical or other liquids requiring pumping or other means of liquid level regulation. For the purpose of explanation, I have selected a common intermittent pump down operation to illustrate the invention. Liquid is admitted to the tank by gravity flow, by means of inlet opening 2, this incoming flow raises water level 3, to a point where it contacts the first electrode protective device 4, until (referring to FIG. 2) the hydrostatic pressure transmits by means of the flexible enclosure 5, to the sealed-in conductive fluid 6, causing fluid level 7 to rise to level 24 and partially immerse the lower portion of electrode 8, thereby causing it to make adequate physical and electrical contact. This action in turn completes electrical contact from the electrode 8, to the sealed-in metal plate 9, and consequently insulated wire 10. This sequence sets the stage for the pump down holding circuit (conventional electrical relay construction). Referring again to FIG. 1, the water level 3 continues to rise and in turn immerses device 11 (which is the same as 4) in a similar manner, which in turn completes an electrical circuit through relay 12, which circuit causes contacts to close, actuating motor starter 13, starting pump 14. Pump 14 continues to operate via the holding coil in relay 12 until the water level recedes to an elevation lower than device 4, which breaks the electrical circuit and causes pump 14 to stop. In the event water level 3 continues to rise, after pump 14 is actuated, it will immerse device 15 causing an electrical circuit to be completed through relay 16, in turn actuating motor starter 17 causing pump 18 to operate and also withdraw water along with pump 14, until the water level is restored to a point below device 4, whereupon both pumps will stop. Pumps 14 and 18 comprise the fluid handling mechanism. Pump 18 would normally be at the same elevation as pump 14, however it is shown above pump 14, for illustration only. After one or both pumps stop the water level 3, can begin to rise again, provided additional water is being admitted at inlet 2, and cause the control to operate the pump or pumps again in the same manner as required for the regulation. Referring again to FIG. 2, a more detailed description of the construction of the device follows:

FIG. 2 representing a typical construction of the device, as illustrated, resembles a cylindrical form. The physical appearance of the device can actually consist of various shapes or forms as may be desired or required for various control applications. Also the actual form, materials and design of the components can vary to suit the ease of manufacture or performance. There are no minimum or maximum dimensions involved, consequently the device could be of minute proportions or as large as desired. Regardless of shape or dimension used the amount of sealed in fluid and length of the electrode will be regulated during manufacture to provide for sufficient contact between the two upon response to the controlled liquid. The device is shown suspended by an insulated conductive wire 23, which carries the weight of the device in addition to providing contact with electrode 8. This wire is secured by the threaded tap in the center of part 19 and the insulation is secured and sealed by a compression of an O type ring or packing by part 20. Part 20, as shown, also secures and seals the flexible enclosure 5, at its upper end, by means of the threaded closure of 19 and 20. The holes 21 and 22 represent means for displaced air to be admitted to the folds 27 of the enclosure 5. The enclosure 5 could be further attached to part 19, if desired, in order to help maintain the shape of the upper portion of the enclosure 5. The position of the lower portion of enclosure 5 when hydrostatic pressure is being exerted is represented by the dotted line 25, while the higher fluid level is represented at 24. The metal plate 9 provides in effect a continuous electrical ground to the sealed-in fluid 6. The weight of the sealed in metal plate 9 also aids in lowering the center of gravity below the center of buoyancy and thereby provides stability. The separate low voltage power supply is represented by 26 which is connected to relays 12 and 16 and to the wires 10 of each device. This connection to wires 10 of the devices would in effect serve the same function as a common ground would for exposed electrodes operating in a conductive liquid. Such a conventional grounded type circuit would be used in one form of the invention where a conductive type of liquid could be controlled without wires 10. In this form the metal plate 9 would contact the liquid being controlled and the conductivity of the tank liquid would serve the purpose of wires 10.

In an application where severe agitation of the tank liquid is expected the device could be suspended in a vertical chamber or pipe which would serve as a stilling well or an area of the tank could be baffled accordingly to minimize any severe hydraulic disturbances.

I claim as new and desire to secure by Letters Patent:

A liquid level control apparatus comprising liquid handling means, a liquid containing tank and a plurality of sealed flexible enclosures, each flexible enclosure housing electrical contact means, an electrically conductive solution and an electrically non-conductive atmosphere, each said enclosure connected to and suspended in the liquid containing tank by insulated electrically conductive means attached to the top of the enclosure and connected to the uninsulated electrical contact means inside the enclosure, this uninsulated electrical contact means being normally surrounded by the electrically non-conductive atmosphere and terminating near the conductive solution in the lower compressible portion of said enclosure, an electrical contact means in the lower portion of the enclosure exposed to the electrically conductive solution within the enclosure, whereby a rise in the tank liquid level causes pressure to be exerted on at least one of the flexible enclosures causing the conductive solution in the compressible lower portion to rise within the enclosure displacing the non-conductive atmosphere into the expandable upper portion of the flexible enclosure and making physical contact with the uninsulated electrical contact means, thereby completing electrical contact between the electrical contact means in the lower portion exposed to the conductive solution and the uninsulated electrical contact means in the upper portion and actuating liquid handling means to control the tank liquid level.

References Cited in the file of this patent
UNITED STATES PATENTS

| | | |
|---|---|---|
| 2,398,375 | Heenan | Apr. 16, 1946 |
| 2,486,785 | Hutcheon | Nov. 1, 1949 |
| 2,536,089 | Ratchford | Jan. 2, 1951 |
| 2,621,268 | Lindstrom | Dec. 9, 1952 |
| 2,697,196 | Harper | Dec. 14, 1954 |
| 2,797,702 | Martin | July 2, 1957 |
| 2,935,582 | Northey | May 3, 1960 |
| 2,979,583 | Johnson | Apr. 11, 1961 |
| 3,045,704 | Williams | July 24, 1962 |